United States Patent
Syed et al.

(10) Patent No.: US 9,545,843 B2
(45) Date of Patent: Jan. 17, 2017

(54) HYBRID ELECTRIC VEHICLE CONTROL FOR MINIMIZING HIGH VOLTAGE BATTERY POWER LIMITS VIOLATIONS

(75) Inventors: Fazal Urrahman Syed, Canton, MI (US); Ming Lang Kuang, Canton, MI (US); Carol Louise Okubo, Belleville, MI (US); Thomas Chrostowski, Chesterfield, MI (US); Matthew D. Smith, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1188 days.

(21) Appl. No.: 12/825,627

(22) Filed: Jun. 29, 2010

(65) Prior Publication Data

US 2011/0010031 A1 Jan. 13, 2011

Related U.S. Application Data

(60) Provisional application No. 61/224,714, filed on Jul. 10, 2009.

(51) Int. Cl.
| | |
|---|---|
| *B60W 20/00* | (2016.01) |
| *B60K 6/445* | (2007.10) |
| *B60W 10/08* | (2006.01) |
| *B60W 10/26* | (2006.01) |
| *B60W 30/20* | (2006.01) |
| *F16H 59/74* | (2006.01) |

(52) U.S. Cl.
CPC .............. *B60K 6/445* (2013.01); *B60W 10/08* (2013.01); *B60W 10/26* (2013.01); *B60W 30/20* (2013.01); *B60L 2240/423* (2013.01); *B60W 20/00* (2013.01); *B60W 2710/083* (2013.01); *F16H 2059/743* (2013.01); *Y02T 10/56* (2013.01); *Y02T 10/6239* (2013.01); *Y02T 10/642* (2013.01)

(58) Field of Classification Search
USPC .............. 701/22, 51; 180/65.28, 65.285, 65; 903/903; 706/1–2, 7–8, 454–47; 477/3, 20
See application file for complete search history.

(56) References Cited

U.S. PATENT DOCUMENTS

| | | | | |
|---|---|---|---|---|
| 5,566,072 | A * | 10/1996 | Momose et al. .............. | 701/117 |
| 6,175,785 | B1 * | 1/2001 | Fujisawa et al. ............... | 701/22 |
| 6,401,016 | B1 * | 6/2002 | Yoshino et al. ................ | 701/22 |
| 6,885,920 | B2 * | 4/2005 | Yakes et al. .................... | 701/22 |
| 7,199,551 | B2 | 4/2007 | Gauthier et al. | |

(Continued)

OTHER PUBLICATIONS

Electric vehicle simulator to determine motor and battery specifications; Jayasundara, J.W.K.K.; Munasinghe, R.; Industrial and Information Systems (ICIIS), 2009 International Conference on; Digital Object Identifier: 10.1109/ICIINFS.2009.5429801; Publication Year: 2009, pp. 540-545.*

(Continued)

*Primary Examiner* — Cuong H Nguyen
(74) *Attorney, Agent, or Firm* — David B. Kelley; Brooks Kushman P.C.

(57) ABSTRACT

A control system and method for controlling a hybrid electric vehicle powertrain with mechanical and electro-mechanical power sources that use an intelligent controller adapted to reduce driveline oscillations while minimizing hybrid vehicle battery limit violations. Damping of driveline torque oscillations is accomplished and violations of battery power limits are avoided by filtering estimated engine power.

19 Claims, 5 Drawing Sheets

(56) References Cited

U.S. PATENT DOCUMENTS

| | | | |
|---|---|---|---|
| 7,254,468 B2* | 8/2007 | Pillar et al. .................. 701/22 |
| 7,277,782 B2* | 10/2007 | Yakes et al. .................. 701/22 |
| 7,302,320 B2* | 11/2007 | Nasr et al. .................... 701/22 |
| 7,599,196 B2* | 10/2009 | Alexander .......... H02M 3/1582 363/124 |
| 7,680,567 B2* | 3/2010 | Syed .................. B60K 6/445 701/22 |
| 7,778,045 B2* | 8/2010 | Alexander .......... H02M 3/1582 363/124 |
| 8,162,795 B2* | 4/2012 | Irie ................................ 477/3 |
| 8,300,426 B2* | 10/2012 | Alexander .......... H02M 3/1582 363/124 |
| 8,989,940 B1* | 3/2015 | Heap .................. B60W 10/10 701/22 |
| 2003/0158638 A1* | 8/2003 | Yakes et al. .................. 701/22 |
| 2005/0113988 A1* | 5/2005 | Nasr et al. .................... 701/22 |
| 2005/0209747 A1* | 9/2005 | Yakes et al. .................. 701/22 |
| 2006/0025906 A1* | 2/2006 | Syed .................. B60K 6/445 701/22 |
| 2006/0058932 A1 | 3/2006 | Garg et al. |
| 2007/0288131 A1* | 12/2007 | Yakes et al. .................. 701/22 |
| 2008/0013351 A1* | 1/2008 | Alexander .......... H02M 3/1582 363/123 |
| 2008/0021628 A1 | 1/2008 | Tryon |
| 2008/0031019 A1* | 2/2008 | Alexander .......... H02M 3/1582 363/37 |
| 2008/0065285 A1* | 3/2008 | Yakes et al. .................. 701/22 |
| 2008/0071438 A1* | 3/2008 | Nasr et al. .................... 701/22 |
| 2008/0097684 A1 | 4/2008 | Syed et al. |
| 2008/0205109 A1* | 8/2008 | Darroman ............... B60L 7/16 363/132 |
| 2010/0067272 A1* | 3/2010 | Alexander .......... H02M 3/1582 363/123 |
| 2010/0100263 A1* | 4/2010 | Aoki et al. .................... 701/22 |
| 2015/0081148 A1* | 3/2015 | Heap .................. B60W 10/10 701/22 |

OTHER PUBLICATIONS

Design and development of few-tooth-deference planetary gear Powertrain Coupling system with biased bent shaft in electric and HEV for all-terrain vehicles; Wang Yong-bin et al.; Vehicle Power and Propulsion Conference, VPPC '08. IEEE Digital Object Identifier: 10.1109/VPPC.2008.4677698; Publication Year: 2008 , pp. 1-5.*

Real-time prediction of torque availability of an IPM synchronous machine drive for hybrid electric vehicles; Fu, Z.X.; Electric Machines and Drives, 2005 IEEE International Conference on; Digital Object Identifier: 10.1109/IEMDC.2005.195724 Publication Year: 2005 , pp. 199-206.*

Power delivery co-ordination to meet driver's demand in a mild hybrid vehicle with automated manual transmission Fayazi, S.A.; Farhangi, S.; Asaei, B.; Industrial Electronics, 2008. IECON 2008. 34th Annual Conference of IEEE Digital Object Identifier: 10.1109/IECON.2008.4757974; Publication Year: 2008 , pp. 327-332.*

Design of a permanent magnet synchronous machine for a flywheel energy storage system within a hybrid electric vehicle Ming Jiang; Salmon, J.; Knight, A.M.; Electric Machines and Drives Conference, 2009. IEMDC '09. IEEE International Digital Object Identifier: 10.1109/IEMDC.2009.5075437; Publication Year: 2009 , pp. 1736-1742.*

The research for power matching strategy of parallel hybrid vehicle; Wu Hong-xing; Kou Bao-quan; Li Li-yi; Vehicle Power and Propulsion Conference, 2008. VPPC '08. IEEE; Digital Object Identifier: 10.1109/VPPC.2008.4677658 Publication Year: 2008 , pp. 1-5.*

Simulation of Fuzzy Optimal Control Strategy on a Parallel Hybrid Electrical Vehicle; Tao Zhao; Qunjing Wang; Weidong Jiang; Zheng Li; Intelligent Control and Automation, 2006. WCICA 2006. The Sixth World Congress on; vol. 2 Digital Object Identifier: 10.1109/WCICA.2006.1713595; Publication Year: 2006 , pp. 8306-8310.*

Hybrid cascaded H-bridge multilevel inverter motor drive DTC control for Electric Vehicles; Khoucha, F.; Lagoun, S.M.; Marouani, K.; Kheloui, A.; Benbouzid, M.E.H.; Electrical Machines, 2008. ICEM 2008. 18th International Conference on Digital Object Identifier: 10.1109/ICELMACH.2008.4800255; Publication Year: 2008 , pp. 1-6.*

Battery Management for Maximum Performance in Plug-In Electric and Hybrid Vehicles; Krein, P.T.; Vehicle Power and Propulsion Conference, 2007. VPPC 2007. IEEE; Digital Object Identifier: 10.1109/VPPC.2007.4544086 Publication Year: 2007 , pp. 2-5.*

State Estimation of a Lithium-Ion Battery Through Kalman Filter; Urbain, M.; Rael, S.; Davat, B.; Desprez, P.; Power Electronics Specialists Conference, 2007. PESC 2007. IEEE; Digital Object Identifier: 10.1109/PESC.2007.4342463 Publication Year: 2007 , pp. 2804-2810.*

Model-Based Electrochemical Estimation and Constraint Management for Pulse Operation of Lithium Ion Batteries; Smith, K.A.; Rahn, C.D.; Chao-Yang Wang; Control Systems Technology, IEEE Transactions on; vol. 18 , Issue: 3 . Digital Object Identifier: 10.1109/TCST.2009.2027023; • study on the dynamic SOC cPublication Year: 2010 , pp. 654-663.*

A study on the dynamic SOC compensation of an ultracapacitor module for the hybrid energy storage systemHyun-Sik Song et al.; Telecommunications Energy Conference, 2009. INTELEC 2009. 31st Inter.; Digital Object Id: 10.1109/INTLEC.2009.5; Publication Year: 2009 , pp. 1-7.*

Operating area of a Switched Reluctance Motor with continuous current operation; Takano, Y.; Maeda, T.; Takeno, M.; Chiba, A.; Hoshi, N.; Takemoto, M.; Ogasawara, S.; Fukao, T.; Power and Energy Society General Meeting, 2010 IEEE; Digital Object Identifier: 10.1109/PES.2010.5590146; Publication Year: 2010 , pp. 1-4.*

Reducing the effect of load torque disturbances in dual inertia systems with lost motion; Schmidt, P.; Rehm, T. American Control Conference, 2004. Proceedings of the 2004; vol. 1; Publication Year: 2004 , pp. 710-715 vol. 1.*

Robust bank angle estimation for rolling stability control on electric vehicle; Kawashima, K.; Hori, Y.; Uchida, T.; Sehoon Oh Advanced Motion Control, 2010 11th IEEE International Workshop on; Digital Object Identifier: 10.1109/AMC.2010.5464087 Publication Year: 2010 , pp. 448-453.*

Decrease of asynchronous rotation-frequence noise and vibration caused by electromagnetic force inside the motor for a hybrid vehicle; Arata, M.; Mochizuki, M.; Araki, T.; Hanai, T.; Matsubara, M.; Power Electronics and Applications (EPE 2011), Proceedings of the 2011—14th European Conference on; Publication Year: 2011 , pp. 1-10.*

Adaptive control of the unique mobility EV drive system to account for time-varying battery parameters; C. Kopf; Battery Conference on Applications and Advances, 1995., Proceedings of the Tenth Annual; Year: 1995; pp. 159-165, DOI: 10.1109/BCAA.1995.398545.*

Regenerative braking strategy for electric vehicles; Jingang Guo; Junping Wang; Binggang Cao; Intelligent Vehicles Symposium, 2009 IEEE; Year: 2009; pp. 864-868, DOI: 10.1109/IVS.2009.5164393.*

* cited by examiner

Fig. 5 ial Application Ser.
HYBRID ELECTRIC VEHICLE CONTROL FOR MINIMIZING HIGH VOLTAGE BATTERY POWER LIMITS VIOLATIONS

REFERENCE TO RELATED APPLICATION

This application is based on Provisional Application Ser. No. 61/224,714, filed Jul. 10, 2009. Applicants claim the benefit of that application. All subject matter disclosed in the provisional application is incorporated by reference in this application.

BACKGROUND

Hybrid electric vehicles can achieve significant improvements in fuel economy and emissions compared to conventional engine powered vehicles without compromising vehicle performance (e.g. vehicle acceleration). The hybridization is accomplished by integrating an electric drive system into a conventional vehicle powertrain. Hybridization is the enabler to 1) downsize the engine for better overall engine operating efficiency; 2) eliminate relatively inefficient engine operating conditions by using electric drive and engine start/stop features; and 3) capture vehicle kinetic energy by using regenerative braking and storing captured energy in the battery.

A hybrid vehicle powertrain typically has two power sources; i.e., an internal combustion engine and a battery-motor system that can provide power to propel the vehicle to meet a driver demand for power. Coordination of control of multiple power sources would maximize benefits of hybridization and would satisfy driver power demand while ensuring compliance with constraints or limits for powertrain subsystems and components. This would avoid damage or a shortened expected life of the subsystems and components.

SUMMARY

It is an objective of the invention to achieve coordinated control of each power source in a hybrid electric vehicle powertrain having two power sources (e.g., an internal combustion engine and an electric motor). A vehicle system controller of the invention interprets a driver's power demand for acceleration and determines the maximum powertrain capability in real time. It then determines the wheel torque command based on driver power demand and powertrain capability. It also determines when and how much torque is needed by each power source to meet the driver's demand and to achieve a specific vehicle performance.

If driveline torque oscillations occur in known hybrid powertrain, the motor and generator speed will oscillate and engine power estimates will oscillate. This is avoided in an embodiment of the invention by introducing a narrow band notch filter that rejects engine power estimate components that are in the driveline natural frequency range.

Filtering may tend to introduce a phase lag that affects accuracy of the engine power estimation, which may result in an incorrect commanded wheel torque that might cause a violation of limits for subsystems and components; e.g., overcharging or overdischarging the battery.

The present invention will reduce any adverse effect of the phase lag introduced by the notch filter by using a weighting function that weights between unfiltered and filtered engine power estimates.

The invention uses an effective fuzzy weight determination and scheduling that uses a weight function based on driver demand and vehicle operating conditions.

DETAILED DESCRIPTION OF AN EMBODIMENT OF THE INVENTION

Figure 1:
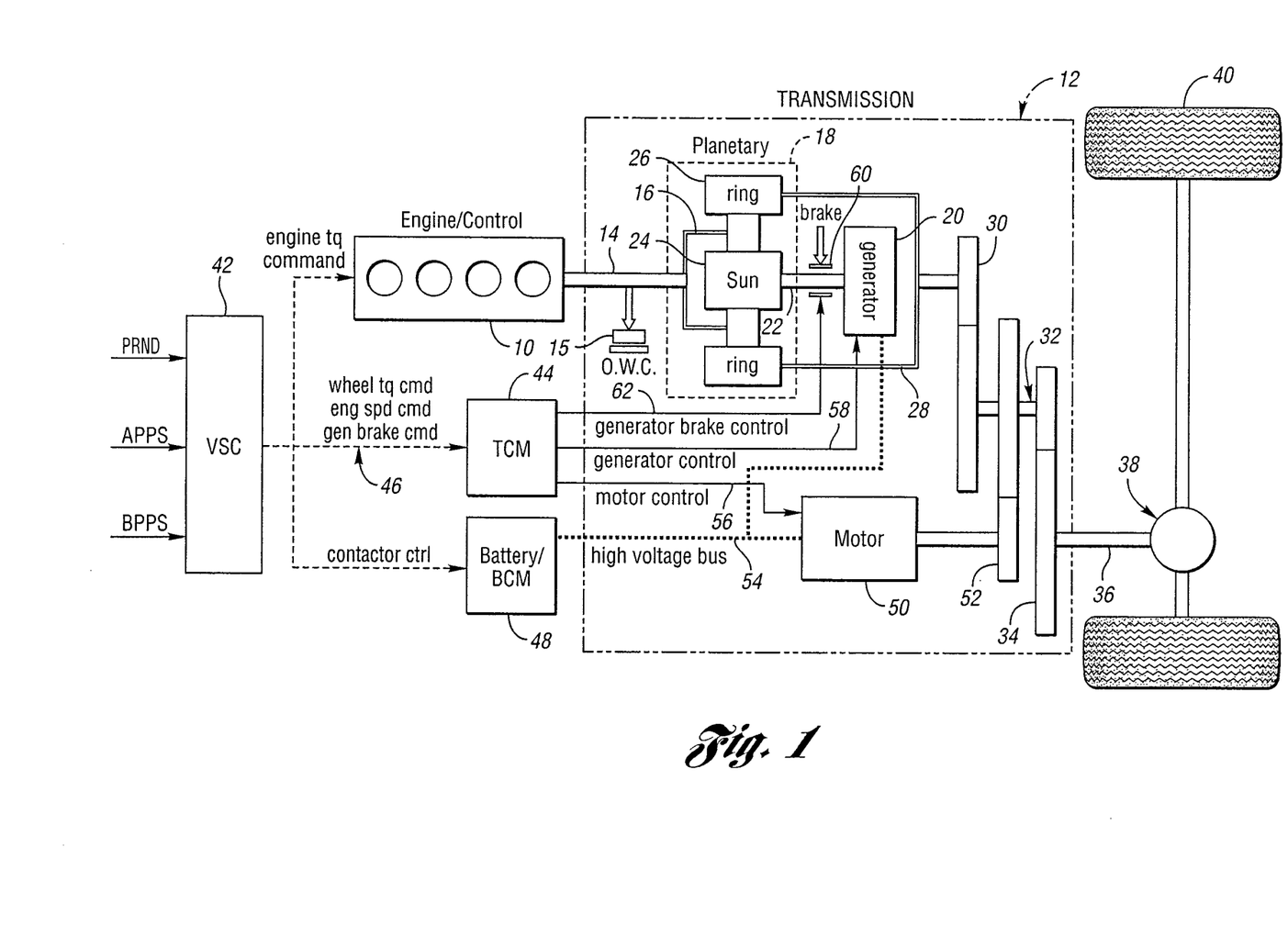
FIG. 1 is a schematic representation of a power-split hybrid electric vehicle powertrain capable of embodying the invention.

The configuration of FIG. 1 includes an internal combustion engine 10 and a power transmission 12. The engine crankshaft of the engine 10, which would correspond to the transmission torque input shaft 14, is connected drivably to the carrier 16 of a planetary gear unit 18. An electric generator 20, which, as mentioned previously, may act as a motor under certain operating conditions, is connected mechanically by shaft 22 to sun gear 24 of planetary gear unit 18. Carrier 16 rotatably supports pinions that engage sun gear 24 and planetary ring gear 26.

A torque transmitting element 28 transfers ring gear torque to torque input element 30 of countershaft gearing 32. An output gear element 34 of the countershaft gearing 32 is connected drivably, as shown at 36, to a differential-and-axle assembly generally indicated at 38, whereby torque is transferred to vehicle traction wheels 40.

A vehicle system controller (VSC) 42 is electrically coupled to a transmission control module (TCM) 44 and to a controller for engine 10. Torque command signals are distributed by the vehicle system controller through signal flow paths, generally indicated at 46, to the engine control. Signal flow paths 46 provide signal communication also between the vehicle system controller 42 and the transmission control module (TCM) 44. A battery and battery control module (BCM) 48 are electrically coupled through signal flow paths 46 to the vehicle system controller 42.

The generator 20 is electrically coupled to electric motor 50. The rotor of motor 50 is mechanically connected to motor torque input gear 52 for the countershaft gearing 32. The electrical coupling between the generator 20 and the motor is provided by a high voltage bus 54, powered by the battery and battery control module 48.

The transmission control module is in communication with the motor 50 through motor control signal flow path 56. The generator communicates with the transmission control module through signal flow path 58, a generator brake, which is indicated at 60, is electrically connected to the transmission control module through signal flow path 62.

When brake 60 is applied, engine power is transmitted through a fully-mechanical torque flow path from the engine, through the planetary gear unit 18 and through the countershaft gearing 32 to the traction wheel-and-axle assembly.

During normal hybrid electric vehicle powertrain operation, the brake 60 would be released and the generator 20 would apply reaction torque to the sun gear, thereby establishing parallel torque flow paths from the engine to the differential-and-axle assembly, and from the motor-generator subsystem through the countershaft gear assembly 32 to the wheel-and-axle assembly.

The powertrain system schematically illustrated in FIG. 1 may rely upon a fully electric motor drive or upon both motor and engine power to achieve maximum efficiency. The system of FIG. 1 may generate electrical power while driving the vehicle using generator power output. The vehicle system controller will maintain the vehicle at its maximum performance point by managing the power distribution among the various components of the vehicle. It manages the operating state of the engine, the generator, the motor, and the battery to maximize total vehicle efficiency. The battery is an energy storage system for the generator and the motor.

Figure 2:
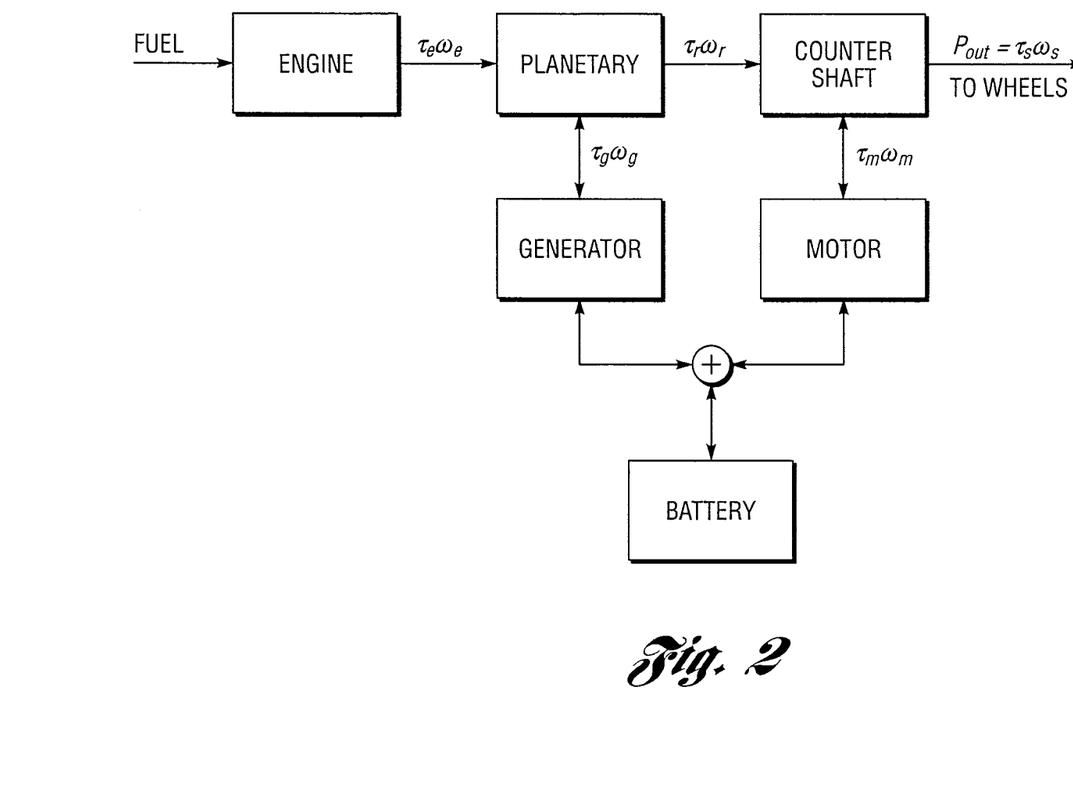
FIG. 2 is a diagram of power flow paths from the two power sources seen in FIG. 1 to vehicle traction wheels.

As indicated in FIG. 2, the engine power can be split into two power flow paths by controlling the generator to effect a mechanical power flow path from the engine 10 to the carrier of the planetary gear unit 18, to the ring gear of the planetary gear unit and to the countershaft gearing 32. An electrical power flow path is established from the engine 10 to the generator 20, to the motor 50 and to the countershaft gearing 32.

The engine power is split by controlling the engine speed to a desired value using the generator, which results in a definite generator speed for a given ring gear speed. The generator speed will change according to vehicle speed for a given desired engine speed. The engine speed will be decoupled from the vehicle speed. The changing generator speed will vary the engine output power split between the electrical power flow path and the mechanical power flow path.

The control of engine speed results in a generator torque to react against the engine output torque. This generator reaction torque results in an engine output torque at the ring gear of the planetary gear set and at the wheels. This mode of operation is called "positive power split."

Because of the kinematic properties of the planetary gear set, the generator can rotate in the same direction as the direction of the torque that reacts against the engine output torque. In this operating mode the generator inputs power to the planetary gear set to drive the vehicle. This operating mode is called "negative power split." As in the case of the "positive power split" mode, the generator torque that results from the generator speed control reacts against the engine output torque and distributes engine output torque to the vehicle traction wheels. This combination of the motor, the generator, and the planetary gear set acts as an electro-mechanical, continuously variable transmission.

When the generator brake is actuated to effect a parallel mode operation, the sun gear is locked from rotating and generator braking torque provides the reaction torque that opposes engine output torque. In this mode of operation, all the engine output torque is transmitted, with a fixed gear ratio, to the vehicle traction wheels through a mechanical torque flow path.

This power split powertrain system, unlike a conventional vehicle powertrain, requires either generator torque resulting from engine speed control or generator brake torque to transmit engine output power through both an electrical and a mechanical power flow path or solely through the mechanical parallel path to effect forward motion of the vehicle.

The second power source causes electric motor power to be drawn from the battery to provide propulsion independently of the engine to drive the vehicle in either a forward direction or a reverse direction. This mode of operation is called "electric drive." In addition, the generator can draw power from the battery and drive against a one-way clutch on the engine output shaft to propel the vehicle in a forward direction. This mode of operation is called "generator drive."

Due to the kinematic properties of the planetary gear set, the engine speed can be decoupled from the vehicle speed to some extent by regulating the generator speed according to the vehicle speed. In addition, the engine requires a reaction torque from the generator that can result from the generator speed control in order to transmit the engine output power to the wheels. The engine power thus is transmitted through an electrical path (engine to generator to motor) and through a mechanical path (engine to ring gear and to the rest of the driveline) to the vehicle traction wheels for forward motion. The combination of the decoupling of engine speed from vehicle speed and the two engine output power flow paths makes this powertrain system emulate a powertrain system with a continuously variable transmission (CVT).

During electric drive, as mentioned above, the electric motor draws power from the battery and provides propulsion independently from the engine to the vehicle traction wheels for forward and reverse motions. This power source makes regenerative braking possible.

In order to integrate the two power sources to work together seamlessly to meet the driver's power demand without exceeding subsystems/components limits (such as battery limits) while optimizing the total powertrain system efficiency and performance, coordinated control between the two power sources is required. As shown in FIG. 1, there is a hierarchical vehicle system controller (VSC) that performs this coordinated control. Specifically, the VSC determines optimally the power sourcing (how much power from the battery) and the operating point (torque and speed) of the engine to meet the driver power demand.

Figure 3:
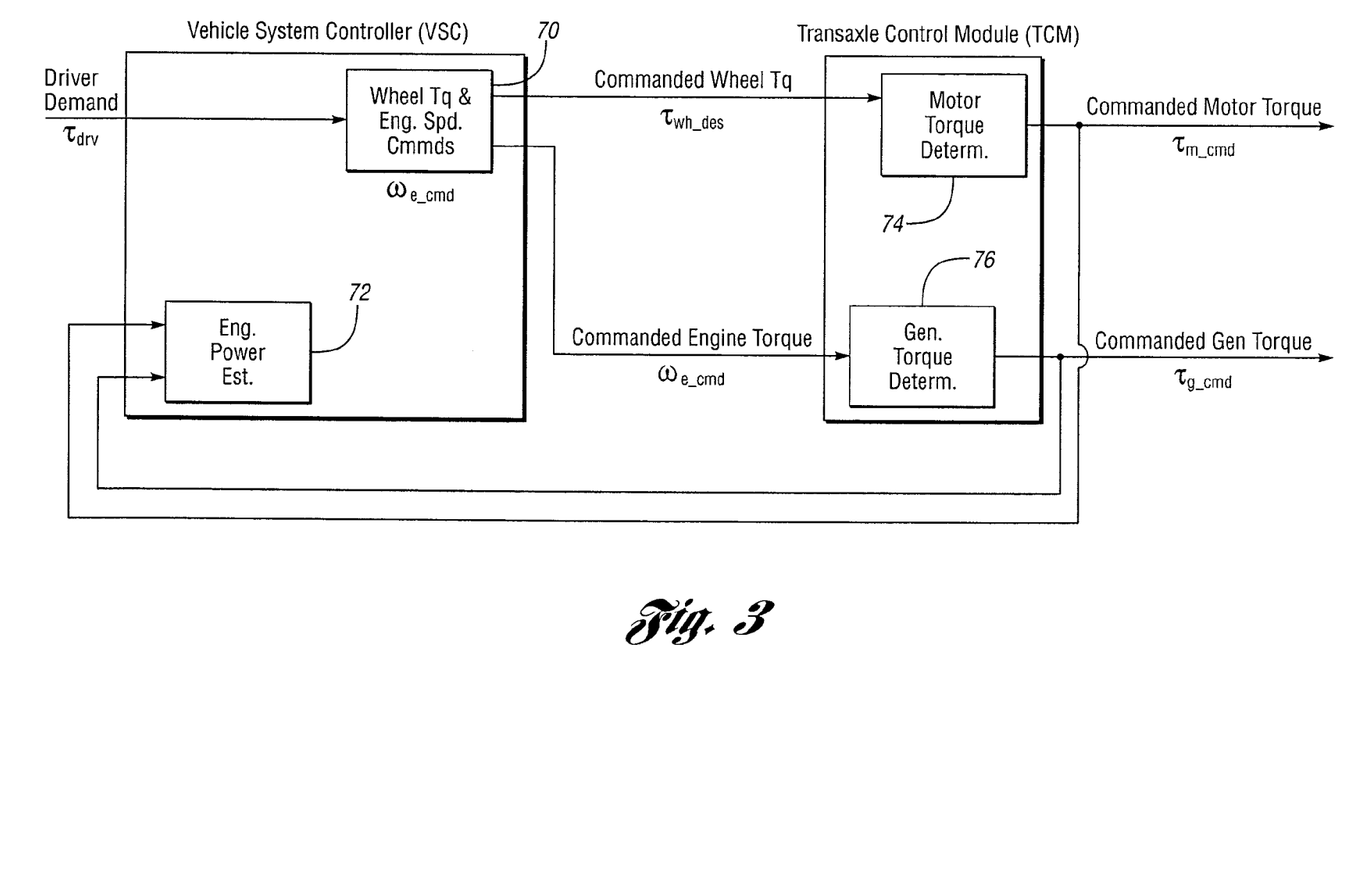
FIG. 3 is a conceptual diagram of vehicle system controls for computing commanded motor torque and commanded generator torque.
Figure 4:
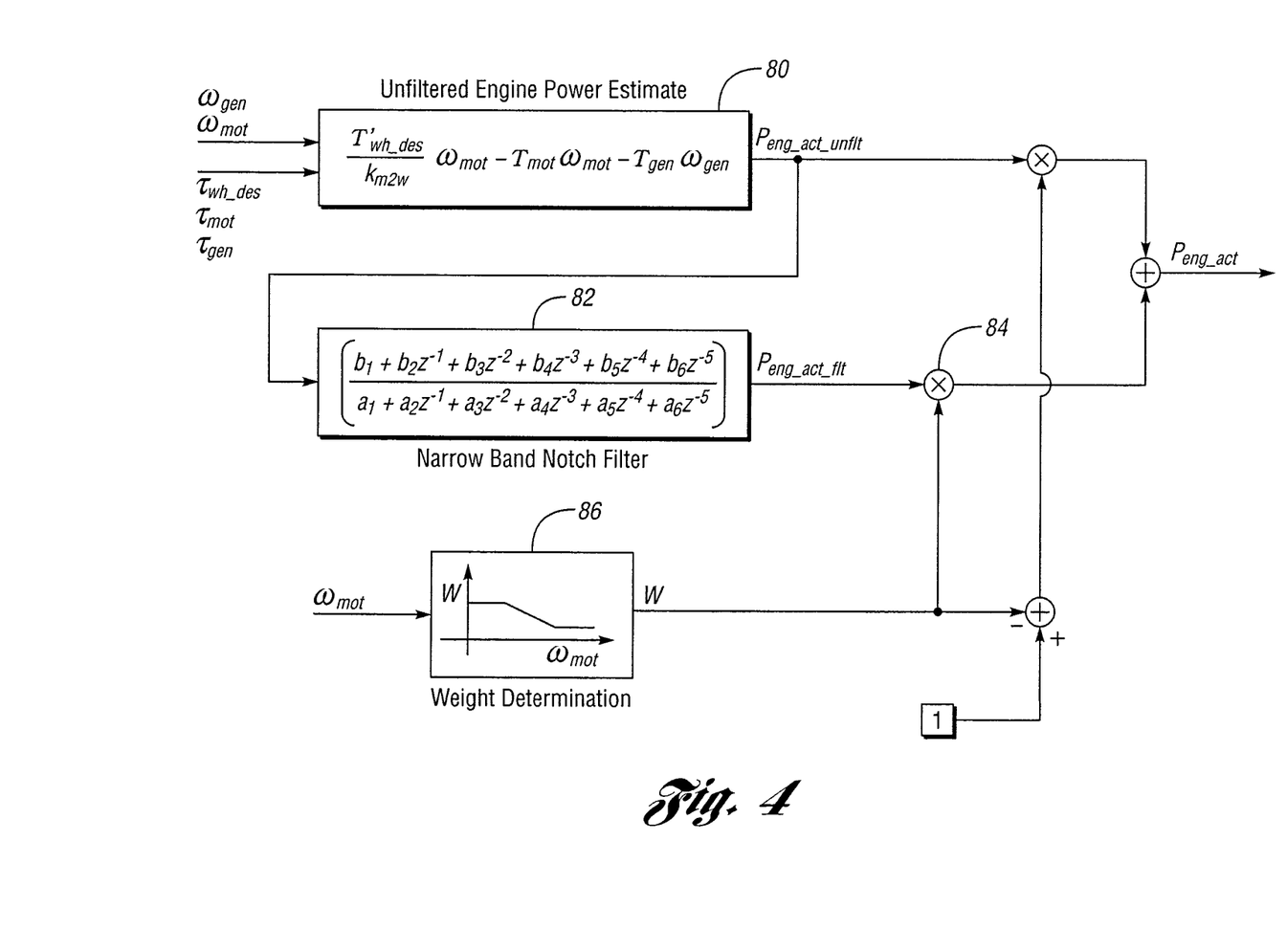
FIG. 4 is a diagram of software steps used to develop engine power estimates using an unfiltered engine power estimate and a weight determination factor.

FIG. 3 and FIG. 4 show the vehicle system controls in an embodiment of the invention. As shown in FIG. 3, the VSC determines commanded wheel torque ($t_{wh\_des}$) primarily based on estimated engine output power at 72 and driver demand torque ($t_{drv}$), as well as engine speed command ($\omega_{e\_cmd}$) at 70 and engine torque command (not shown) to the engine controller. These serve as inputs for commanded motor torque determination at 74 and generator torque determination at 76.

FIG. 4 shows the engine power estimation that will satisfy the driver demand, yet ensure compliance with subsystem/components limits, such as battery charge and discharge limits. It is seen from FIG. 4 that the engine power estimation comprises calculating the unfiltered engine power estimate at 80, filtering the estimate with a narrow band notch filter at 82, then algebraically summing the unfiltered and filtered engine power estimate at 80 with a weighting function W, seen at 86. The weighting is primarily a function of motor speed $\omega_{mot}$ (a vehicle speed equivalent).

Figure 5:
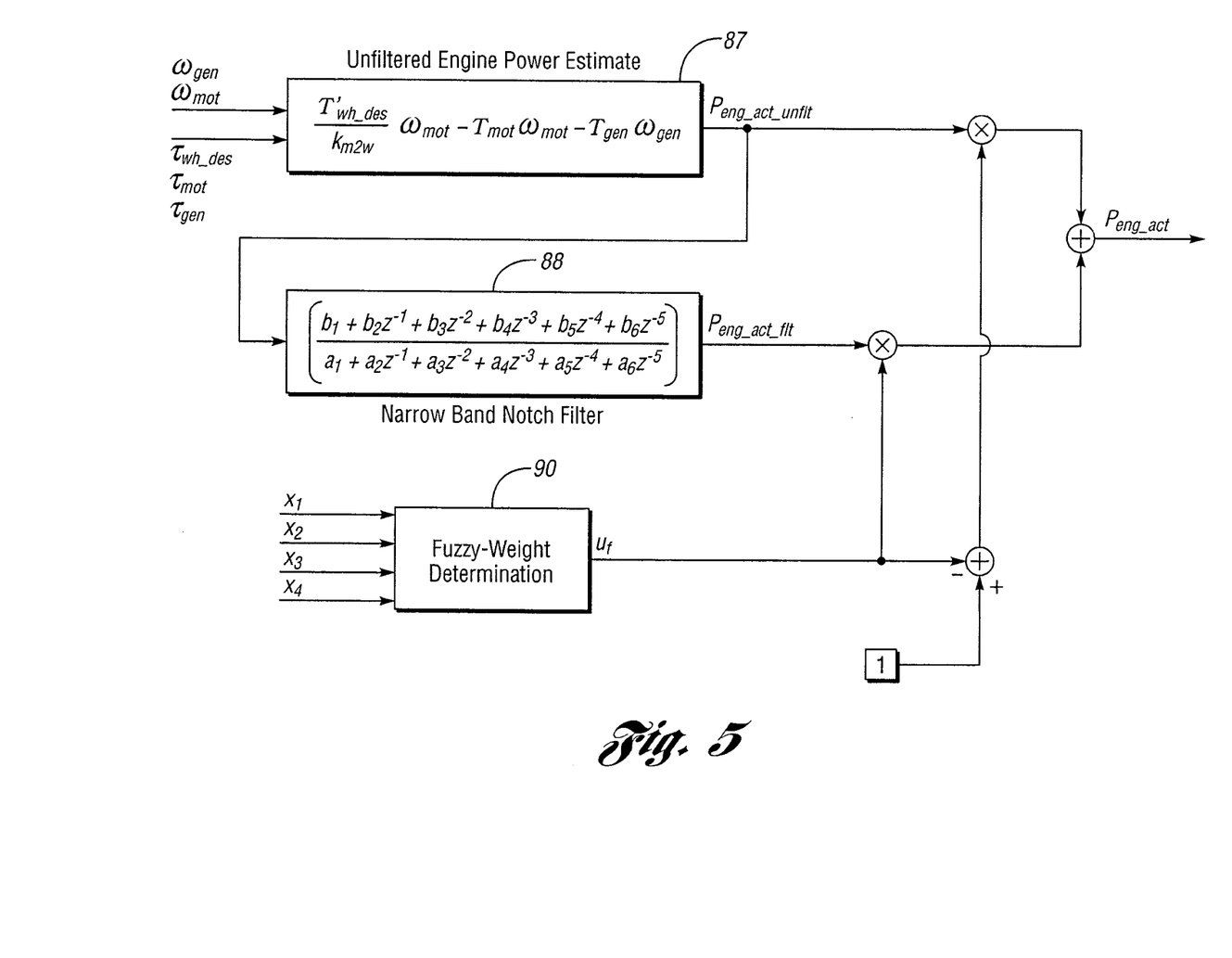
FIG. 5 is a diagram of software steps used to obtain an actual engine power estimate using a fuzzy weight determination.

In an implementation of engine power estimation in FIG. 5, the unfiltered engine power estimate ($P_{eng\_act\_unflt}$) seen at 87 is based on commanded wheel torque, motor torque and speed, and generator torque and speed. If any driveline oscillations occur, the motor speed and the generator speed will also be oscillating, which in turn will result in engine power estimate oscillations. This oscillatory engine power estimate can cause commanded wheel torque oscillations, especially when the driver demands maximum acceleration or the battery has limited capability (charge and discharge power limits). This oscillatory commanded wheel torque will amplify the initial oscillations in the driveline since a positive feedback loop exists.

To break down the positive feedback, a narrow band notch filter is introduced at 88 in FIG. 5 that rejects the engine power estimate components that are in the driveline natural frequency range (about 5-8 Hz). As well known, any kind of filtering will introduce phase lag that affects the accuracy of the engine power estimation. This inaccuracy can result in an incorrect commanded wheel torque that can cause violation of subsystems/components limits; e.g., overcharge or discharge of the battery.

To minimize the adverse effect of the phase lag introduced by the notch filter 82 seen in FIG. 4, the weighting function W is weights between the unfiltered and filtered engine power estimates. As mentioned above, the weighting value is determined based on motor speed $\omega_{mot}$ as shown in FIG. 4. This is because the susceptibility of the vehicle controls to driveline torque oscillation disturbance is vehicle speed dependent. For example, the vehicle controls are more susceptible to driveline oscillation disturbance when vehicle speed is below about 30 mph when a driver demands maximum power. Hence, when the vehicle is operating in the region where the vehicle controls are more susceptible to the disturbance, more weighting is placed on the filtered engine power estimate in the engine power estimation calculation. Otherwise, less weighting is placed on the filtered estimate to reduce any unnecessary phase lag effect.

In summary, for appropriately given battery power limit buffers and limit violation tolerance, the current implementation meets requirements for satisfying the driver demand with maximum powertrain capability and smooth transitions while in compliance with battery power limits.

The invention includes a method for applying an effective fuzzy weight-scheduling (or determination) to replace the simple motor speed dependent weight determination, and for determining the weight value based on driver demand and vehicle operating conditions. FIG. 5 shows the conceptual diagram of the method.

The fuzzy weight-scheduling controller, seen in FIG. 5 at 90, improves high voltage battery power limits management in a HEV by using human control knowledge and experience to intuitively construct an intelligent controller so that the resulting controller will emulate the desired control behavior to a certain extent. A multiple-input single-output (MISO) Mamdani fuzzy weight-scheduling controller is utilized. The formulation of the proposed fuzzy weight-scheduling controller can be described as follows:

$$P_{eng\_act} = \left(\frac{T'_{wh\_des}}{k_{m2w}}\omega_{mot} + T_{mot}\omega_{mot} + T_{gen}\omega_{gen}\right) \times \quad (1.1)$$
$$\left((1-u_f) + u_f \frac{b_1 + b_2 z^{-1} + b_3 z^{-2} + b_4 z^{-3} + b_5 z^{-4} + b_6 z^{-5}}{a_1 + a_2 z^{-1} + a_3 z^{-2} + a_4 z^{-3} + a_5 z^{-4} + a_6 z^{-5}}\right),$$

where $u_f$ is the dynamically adjusted fuzzy scheduled weight output of the MISO fuzzy logic weight-scheduler controller.

Equation (1.1) can be re-written as follows:

$$P_{eng\_act} = (1 - u_f)P_{eng\_act\_inst} \times u_f P_{eng\_act\_flt}, \quad (1.2)$$

where $$P_{eng\_act\_inst} = \left(\frac{T'_{wh\_des}}{k_{m2w}}\omega_{mot} + T_{mot}\omega_{mot} + T_{gen}\omega_{gen}\right) \quad (1.3)$$

$$P_{eng\_act\_flt} = \left(\frac{T'_{wh\_des}}{k_{m2w}}\omega_{mot} + T_{mot}\omega_{mot} + T_{gen}\omega_{gen}\right) \quad (1.4)$$
$$\frac{b_1 + b_2 z^{-1} + b_3 z^{-2} + b_4 z^{-3} + b_5 z^{-4} + b_6 z^{-5}}{a_1 + a_2 z^{-1} + a_3 z^{-2} + a_4 z^{-3} + a_5 z^{-4} + a_6 z^{-5}},$$

where $P_{eng\_act\_inst}$ is the pre-filtered (or unfiltered) engine power estimate and $P_{eng\_act\_flt}$ is the filtered engine power estimate. Comparing equations in FIG. 4 and equation (1.1), it can be seen that fuzzy weight scheduling engine power estimation controller at 90 replaces the term W with the fuzzy scheduled weight output $u_f$, as seen at 90.

If $u_f$=W under all operating conditions, then the fuzzy weight-scheduling engine power estimation controller reduces to a simple weighted engine power estimation controller.

To effectively design a fuzzy logic based weight-scheduler, input variables, output variables, and input and output fuzzy sets need to be defined. First, since the driver demand wheel torque ($T_{mod}$) can affect drivability, it is used as a predictive input to determine if filtering of the actual engine power is needed to achieve improved drivability. On the other hand, to ensure that high voltage battery power is effectively within its limits, the magnitude of an error between the pre-filtered engine power estimate and the final engine power estimate is selected as one of the other inputs to the fuzzy logic weight-scheduler. Similarly, high voltage battery power limits provide a buffer to the amount of inaccuracy in engine power estimate that can be tolerated. Therefore the difference between the high voltage battery discharge power limit ($P_{bat\_dch\_lim}$) and desired electrical power ($P_{elec\_des}$) is used as one of the other inputs. Finally, the motor speed (or vehicle speed) is used as the final input because it can be used as the predictor of expected drivability issues at various vehicle or motor speeds. The input variables for the controller can be written as follows, $$x_1(n) = T_{mod}(n) = \frac{P_{mod}(n)}{k_{m2w}\omega_{mot}(n)} \quad (1.5)$$

$$x_2(n) = |P_{eng\_act\_unf}(n) - P_{eng\_act}(n)| \quad (1.6)$$

$$x_3(n) = P_{bat\_dch\_lim}(n) - P_{elec\_des}(n) \quad (1.7)$$

$$x_4(n) = \omega_{mot}(n). \quad (1.8)$$

The input fuzzy sets or membership functions for $x_1(n)$, $x_2(n)$, $x_3(n)$ and $x_4(n)$ are chosen as trapezoidal and triangular functions. The input fuzzy sets or membership functions for $x_1(n)$, $x_3(n)$ and $x_4(n)$ are chosen to be low, and high trapezoidal functions where $b_{1L}$, $b_{3L}$, $b_{4L}$ represent the low value of the trapezoidal function for the three input membership functions and $b_{1H}$, $b_{3H}$, $b_{4H}$ represent the high value of the trapezoidal functions for the three input membership functions.

The input fuzzy sets or membership functions for $x_2(n)$ are chosen to be low, medium and high trapezoidal/triangular functions where $b_{2L}$ and $b_{2H}$ represent the low and high values of the trapezoidal functions, respectively, for the $x_2(n)$ input membership functions, and $b_{2M}$, represent the medium value of the triangular functions for the $x_2(n)$ input membership function. The output fuzzy sets are of singleton type for the fuzzy scheduled weight representing maximum (max or $h_{MX}$), high ($h_H$), medium (med or $h_{ME}$), low ($h_L$), minimum (min or $h_{MN}$) and zero ($h_Z$) values.

The fuzzy rules for this weight-scheduler are described in Table 1. The fuzzy rules are laid out in a manner such that they can distinguish between various HEV powertrain behaviors and make a decision regarding the current and future states of the powertrain. In this way the fuzzy rules can anticipate and optimize to cover conditions where high voltage battery power violations can be improved while maintaining improved drivability of the vehicle. The fuzzy rules are shown in Table 1.

TABLE 1

Fuzzy rules for the fuzzy weight-scheduler

| Rule No. | if $x_1(n)$ is | if $x_2(n)$ is | if $x_3(n)$ is | if $x_4(n)$ is | if $u_f(n)$ is | Explanation |
|---|---|---|---|---|---|---|
| 1 | low | low | low | low | Max | Steady state condition where drivability can be improved and there is no concern of HV battery power control. |
| 2 | low | low | low | high | Med | Steady state condition with less chance of drivability issues due to higher vehicle speed and so HV battery power control can be improved. |
| 3 | low | low | high | low | High | Steady state condition where drivability can be affected due to low vehicle speed. |
| 4 | low | low | high | high | Med | Steady state condition where HV battery power limits are available and vehicle speed is high, so HV battery power controls can be improved. |
| 5 | low | med | low | low | Low | Transient condition where HV battery power controls can be improved, as wheel torque is low. |
| 6 | low | med | low | high | Zero | Transient condition where HV battery power controls can be improved, as wheel torque is low and vehicle speed is high. |
| 7 | low | med | high | low | Min | Transient condition where HV battery power controls can be improved, as wheel torque is low and HV battery power limits are available. |
| 8 | low | med | high | high | Zero | Transient condition where HV battery power controls can be improved, as wheel torque is low, HV battery power limits are available and vehicle speed is high. |
| 9 | low | high | low | low | Low | Fast transient condition where HV battery power controls can be improved, as wheel torque is low. |
| 10 | low | high | low | high | Zero | Fast transient condition where HV battery power controls can be improved, as wheel torque is low and vehicle speed is high. |
| 11 | low | high | high | low | Med | Fast transient predictive condition where drivability can be an issue but HV battery power controls can be improved, as wheel torque is low and HV battery power limits are available. |
| 12 | low | high | high | high | Zero | Fast transient condition where HV battery power controls can be improved, as wheel torque is low and HV battery power limits are available. |
| 13 | high | low | low | low | Max | Steady state condition where drivability can be improved and there is no concern of HV battery power control. |
| 14 | high | low | low | high | High | Steady state condition with more chance of drivability issues due to higher vehicle speed and wheel torque so HV battery power control can be improved. |
| 15 | high | low | high | low | High | Steady state condition where drivability can be affected due to low vehicle speed. |
| 16 | high | low | high | high | Med | Steady state condition where HV battery power limits are available and vehicle speed is high, so HV battery power controls can be improved. |
| 17 | high | med | low | low | High | Transient condition where drivability can be an issue, as wheel torque is high. |
| 18 | high | med | low | high | Med | Transient condition where HV battery power controls can be improved but drivability is a concern, as wheel torque is high and vehicle speed is high. |
| 19 | high | med | high | low | Med | Transient condition where HV battery power controls can be improved but drivability is a lower concern, as wheel torque is high, vehicle speed is high and HV battery power limits are available. |
| 20 | high | med | high | high | Low | Transient condition where HV battery power controls can be improved, as wheel torque is high, but HV battery power limits are available and vehicle speed is high. |
| 21 | high | high | low | low | Med | Fast transient condition where drivability is a concern but HV battery power controls can be improved, as wheel torque is high. |
| 22 | high | high | low | high | Low | Fast transient condition where HV battery power controls can be improved, as wheel torque is high but vehicle speed is high. |
| 23 | high | high | high | low | Low | Fast transient condition where drivability can be an issue but HV battery power controls can be improved, as wheel torque is high and HV battery power limits are also available . |

TABLE 1-continued

Fuzzy rules for the fuzzy weight-scheduler

| Rule No. | if $x_1(n)$ is | if $x_2(n)$ is | if $x_3(n)$ is | if $x_4(n)$ is | if $u_f(n)$ is | Explanation |
|---|---|---|---|---|---|---|
| 24 | high | high | high | high | Min | Fast transient condition where HV battery power controls can be improved, as wheel torque is high but HV battery power limits are also available. |

Some of the rules are intended to cover both steady state and transient conditions under various driving conditions, such as scenarios where high voltage battery limits or driver demand torque or vehicle speed (motor speed) conditions are important for acceptable drivability and reduced high voltage battery power limits violations. For example, Rules 1 and 13, where $x_1(n)$ is either low or high and $x_2(n)$, $x_3(n)$, and $x_4(n)$ are all low, depict a steady state or close to a steady state predictive condition where, under current state, the error from a filtering effect of the engine power estimate is low, but the vehicle speed and the difference between the high voltage battery discharge power limit and the desired electrical power are also low. Under such conditions, if the driver were to perform a transient event, the drivability would be severely affected due to driveline oscillations unless a very high or max ($h_{MX}$) fuzzy-scheduled weight is used.

Similarly, Rules 10 and 12, $x_1(n)$ is low, $x_2(n)$ is high, $x_3(n)$ is either low or high, and $x_4(n)$ is high. These describe conditions where, due to low driver demand torque and high vehicle speeds, the impact of zero fuzzy-scheduled weight ($h_{MX}$) on drivability is negligible. But since transient event is involved, using such a lower fuzzy-scheduled weight will significantly reduce high voltage battery power limits violation. In other words, it will improve the transient high voltage battery power control.

In summary, these rules schedule weights for engine power estimation, which can significantly improve high voltage battery power control (or reduce high voltage battery power limits violations) without compromising the vehicle's drivability.

If $\Omega$ represents the total number of fuzzy rules (e.g., $\Omega=24$) and $u_j(x_i, \tilde{A}_{i,j})$ represents the combined membership value from the antecedent of the jth rule, the output, $u_f(n)$ of the fuzzy weight scheduler can be written as follows when the centroid defuzzifier is employed:

$$u_f(n) = \frac{\sum_{j=1}^{\Omega} u_j(x_1, \tilde{A}_{1,j}) u_j(x_2, \tilde{A}_{2,j}) u_j(x_3, \tilde{A}_{3,j}) \tilde{h} u_j(x_4, \tilde{A}_{4,j}) \tilde{h}_j}{\sum_{j=1}^{\Omega} u_j(x_1, \tilde{A}_{1,j}) u_j(x_2, \tilde{A}_{2,j}) u_j(x_3, \tilde{A}_{3,j}) u_j(x_4, \tilde{A}_{4,j})}, \quad (1.9)$$

where $x_i$ represents all the inputs (i=1 . . . 4) and $\tilde{A}_{i,j}$ is a vector involving all the input fuzzy sets and $\tilde{h}_j$ represents the output fuzzy set for the $j^{th}$ rule.

Using (1.2), the complete fuzzy controller system for the engine power estimation can be defined by the following equation:

$$P_{eng\_act} = \left(1 - \frac{\sum_{j=1}^{\Omega} u_j(x_1, \tilde{A}_{1,j}) u_j(x_2, \tilde{A}_{2,j}) u_j(x_3, \tilde{A}_{3,j}) \tilde{h} u_j(x_4, \tilde{A}_{4,j}) \tilde{h}_j}{\sum_{j=1}^{\Omega} u_j(x_1, \tilde{A}_{1,j}) u_j(x_2, \tilde{A}_{2,j}) u_j(x_3, \tilde{A}_{3,j}) u_j(x_4, \tilde{A}_{4,j})}\right) \quad (1.20)$$

$$P_{eng\_act\_unslt} \times$$

$$\left(\frac{\sum_{j=1}^{\Omega} u j(x_1, \tilde{A}_{1,j}) u_j(x_2, \tilde{A}_{2,j}) u_j(x_3, \tilde{A}_{3,j}) \tilde{h} u_j(x_4, \tilde{A}_{4,j}) \tilde{h}_j}{\sum_{j=1}^{\Omega} u j(x_1, \tilde{A}_{1,j}) u_j(x_2, \tilde{A}_{2,j}) u_j(x_3, \tilde{A}_{3,j}) u_j(x_4, \tilde{A}_{4,j})}\right)$$

$$P_{eng\_act\_flt}$$

In order to study the performance of the controllers, a custom test that could emphasize the controller's high voltage battery power limit violations can be used. The vehicle could be tested at speeds of 10 mi/hr, 20 mi/hr, 30 mi/hr 40 mi/hr, 50 mi/hr, and 60 mi/hr, where the high voltage battery power limits are set to 0 kW, and the driver demand is changed in a manner that will result in large changes in the desired engine power, which will also result in large changes in the actual engine power. Such a test would emphasize a change of actual engine power to monitor the high voltage battery power limits violations.

Table 2 illustrates examples of possible battery power limit violations and the possible high voltage battery power limit violation improvement by using the present invention.

TABLE 2 battery power limit violations and available improvement

| Vehicle Speed | HV battery charge limit violation using FWEC | HV battery discharge limit violation using FWEC | HV battery power limit average violation using FWEC | HV battery power limit violation improvement using FWEC |
|---|---|---|---|---|
| 10 mi/hr | −1.59 kw | 3.21 kw | 2.40 kw | 45.70% |
| 20 mi/hr | −1.74 kw | 1.85 kw | 1.80 kw | 55.56% |
| 30 mi/hr | −1.98 kw | 2.52 kw | 2.25 kw | 60.80% |
| 40 mi/hr | −2.23 kw | 3.30 kw | 2.77 kw | 44.27% |
| 50 mi/hr | −2.64 kw | 2.72 kw | 2.68 kw | 54.42% |
| 60 mi/hr | −4.64 kw | 4.26 kw | 4.45 kw | 23.01% |

Table 2 shows that use of the fuzzy weight-scheduling engine power estimation control system may improve battery power limits violations by about 23% to about 61%. This improvement is significant in meeting stringent performance requirements for hybrid vehicles.

While the best mode for carrying out the invention has been described in detail, those familiar with the art to which this invention relates will recognize various alternative designs and embodiments for practicing the invention as defined by the following claims.

What is claimed:

1. A control system for a hybrid electric vehicle powertrain comprising:

an engine and engine controller, a battery, a motor-generator, gearing establishing power flow paths to vehicle traction wheels, and a system controller for managing power distribution to the traction wheels to meet driver demand;

the system controller being configured to monitor vehicle operating conditions, to calculate an engine output power estimate and to command a traction torque based on estimated engine output power;

the engine output power estimate being determined by input variables including generator speed, motor speed and engine torque commands to the system controller;

the system controller being configured further to filter the estimated engine output power, to reduce torque disturbances in the power flow paths, and to develop a weight determination factor for modifying the engine output power estimate; and the weight determination factor being adaptive to variable vehicle operating conditions, to satisfy driver torque demand while ensuring compliance with predetermined battery charge and discharge limits.

2. The control system set forth in claim 1 wherein the system controller is configured to calculate the weight determination factor based on at least driver torque demand.

3. The control system set forth in claim 2 wherein the controller is configured to calculate a filtered engine power estimate by filtering the engine output power estimate with a narrow band notch filter and to sum the unfiltered and filtered engine output power estimates, the filtered and unfiltered engine power estimates being modified by the weight determination factor, the weight determination factor being determined by fuzzy rules corresponding to variable vehicle operating conditions.

4. A method for controlling a vehicle having an engine, generator, battery, and motor comprising:

computing estimated engine output power based on at least one of generator speed, desired traction wheel torque and motor speed;

filtering the estimated engine output power; and applying a weighting factor to the estimated engine output power, the weighting factor adaptive to variable vehicle operating conditions to satisfy driver torque demand while ensuring compliance with predetermined battery charge and discharge limits.

5. A hybrid vehicle system, comprising:

an engine coupled to a generator; and a controller that controls the engine and the generator based on an estimated engine output power computed using at least one of generator speed, desired wheel torque, and motor speed, filters the estimated engine output power, and applies a weighting factor based in part on driver torque demand to unfiltered and filtered engine output power estimates to meet the driver torque demand.

6. The system of claim 5 wherein the controller filters the estimated engine output power using a narrow band notch filter that rejects engine power components that are in a natural frequency range of a power delivery element of the vehicle.

7. The method set forth in claim 4 wherein the engine output power estimate and unfiltered engine output power estimate are filtered with a narrow band notch filter, and wherein the step of applying the weighting factor comprises:

algebraically summing unfiltered and filtered engine power estimate with the weighting factor applied to each estimate, whereby engine output power estimates are maintained to values that will avoid driveline torque disturbances in excess of values that are in compliance with battery power limits.

8. The method set forth in claim 4 wherein the weighting factor is based on both driver torque demand and vehicle operating conditions.

9. The method set forth in claim 8 wherein multiple weighting factor determinations are used in developing fuzzy rules applied by a fuzzy weight scheduling controller.

10. The method set forth in claim 9 wherein the weighting factor determinations are dependent on whether traction wheel torque demand requires filtering.

11. The method set forth in claim 9 wherein an error between an unfiltered engine output power estimate and a filtered engine output power estimate is used in a determination of a value of the weighting factors.

12. The method set forth in claim 9 wherein a difference in battery power limits and desired electrical power on input variable is used in a determination of the weighting factors.

13. The method set forth in claim 9 wherein each fuzzy rule corresponds to a separate vehicle operating condition.

14. The method set forth in claim 10 wherein a steady driving state is recognized for a group of vehicle operating conditions including wheel torque, changes in engine power, differences between a battery power limit, current battery power, and vehicle speed, whereby drivability is improved by reducing driveline resonance below a calibrated percentage of peak wheel torque at a given vehicle speed to reduce battery power limit violations.

15. The method set forth in claim 10 wherein a transient driving state is recognized for a group of vehicle operating conditions including wheel torque, changes in engine power, differences between a battery power limit and current battery power, and vehicle speed, whereby drivability is improved by reducing driveline resonance below a calibrated percentage of peak wheel torque at a given vehicle speed to reduce battery power limit violations.

16. The method set forth in claim 9 wherein motor speed is used in the determination of a weighting factor.

17. The method set forth in claim 9 wherein filtering the engine power estimate comprises using a narrow band notch filter that rejects engine power components that are in a natural frequency range of a power delivery element of the vehicle powertrain.

18. The method set forth in claim 7 wherein filtering the estimated engine power output comprises using a narrow band notch filter that rejects engine power components that are in a natural frequency range of a power delivery element of the vehicle powertrain.

19. The system of claim 5 wherein the controller determines the weighting factor based on a difference in battery power limits and a desired electrical power on input variable.

* * * * *